May 5, 1953  A. C. GREZ  2,637,316

ELECTRICAL MEASURING APPARATUS

Filed July 31, 1950

INVENTOR
ARMAND C. GREZ,
BY
ATTORNEY

Patented May 5, 1953

2,637,316

UNITED STATES PATENT OFFICE 2,637,316

ELECTRICAL MEASURING APPARATUS

Armand C. Grez, New York, N. Y.

Application July 31, 1950, Serial No. 176,837

1 Claim. (Cl. 128—2.1)

This invention relates to electrical measuring apparatus, and more particularly to a novel apparatus for measuring the electrical potential of blood in vivo.

Extensive studies made of human blood give strong indication that the blood of well persons has a more or less definite normal electric potential and that in disease there is a deviation from normality. For example, I have thus far established that the blood of cancer patients has an increased potential as compared to normal, and that in disease other than cancer the blood potential may be higher or may even deviate from the normal in the opposite direction. I have also found that just before death, the blood potential of cancer patients which was extremely high throughout their illness, dropped considerably. All of the foregoing leads me to believe that the potential factor of blood in vivo is of extreme importance clinically, not only in the detection of disease but also in the prevention thereof, and possibly long before disease becomes manifest by actual physical disability.

With the above in mind, the present invention contemplates and provides novel apparatus for measuring and giving indication of the electrical potential of blood in vivo, that is to say, directly within the body of a living person and without taking the blood whose potential is to be measured from the body.

Another object of the invention is the provision of apparatus for measuring the electrical potential of blood in vivo, which employs electrodes capable of being applied to a vein of a living person in manner generally similar to an intravenous needle.

A further object of the invention is the provision of electrical apparatus for measuring the potential of blood of living persons employing spaced electrodes, of which one electrode preferably takes the form of an intravenous needle modified to function as an electrode, and the other electrode cooperates therewith similarly to a conventional stylet, but is adapted to be introduced into the vein through the needle after the latter has been applied to the vein.

Yet another object of the invention is the provision of an electrode structure adapted to be applied to the vein of a living person in manner similar to an intravenous needle, characterized by electrical outlets enabling it to be readily connected with a standard micro-voltmeter or other device for registering small electrical potentials.

The above and other objects and advantages of apparatus for measuring the potential of blood in vivo according to the invention will be seen from the following detailed description thereof, taken with the accompanying drawings illustrating a physical embodiment of the invention giving excellent results in practice, wherein—

Figure 1:
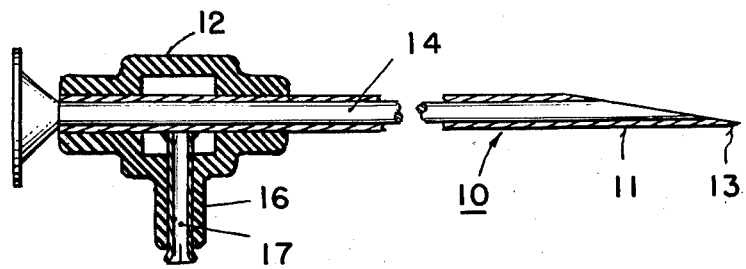
Fig. 1 is a greatly enlarged longitudinal section taken through a modified intravenous needle according to the invention, the cannula thereof forming one electrode of the measuring apparatus.

In the drawings, wherein like reference characters designate like parts throughout the several views, numeral 10 generally designates a modified intravenous needle according to the invention, the same comprising a tubular needle or cannula 11 having one end extending into and being fixedly secured in a cylindrical body or end fitting 12, and its other end beveled to a point 13 which is adapted to be placed in the vein. A stylet 14 (Fig. 1) is adapted to be introduced into and withdrawn from the bore of the cannula as is well known in intravenous needle construction.

According to the invention, the needle is made from a conductive metal such as steel or brass, thus enabling it to function as an electrode and its point 13 as an electrode tip, whereas the end fitting 12 may be fashioned either from metal or from any suitable non-conducting material such as hard rubber, or it may be molded from one of the appropriate insulating plastics. Various means of making electrical connection to the needle may be employed, but in the illustrated construction the end fitting includes in its structure a sleeve 16 which mounts a female socket 17 of conducting material which is electrically connected at its inner end to the housed end of the needle. By reference to Fig. 2, the socket 17 is adapted to receive the male terminal or plug 18 of one conductor 19 of a micro-volmeter 20 or other device for measuring and indicating small electrical potentials.

According to the invention, the other electrode of the required pair thereof is adapted to be introduced into the bore of the needle 11 following withdrawal of the stylet 14 therefrom. By reference to Fig. 2, said other electrode 22 consists of an extremely small-diameter rod of conductive metal of the general type used in cystoscopic or fulguration treatment. One electrode suitable for the intended purposes of the invention is known as the "McCarthy Miniature Fulgurating Electrode," gauge 3.5 French, manufactured by the American Cystoscopic Company. To provide insulation between the electrodes, the body of the rod 22 is coated with a thin film 23 of rubber or other insulating material, and the rod terminates at its inner end in an uncoated electrode tip 24 which is preferably ball-shaped as shown. Its other end extends into a bored plug 25 and is electrically connected to a female socket 26 mounted in the plug bore, the socket being adapted to receive the male terminal or plug 27 of the other conductor 28 leading to the micro-voltmeter 20.

Figure 2:
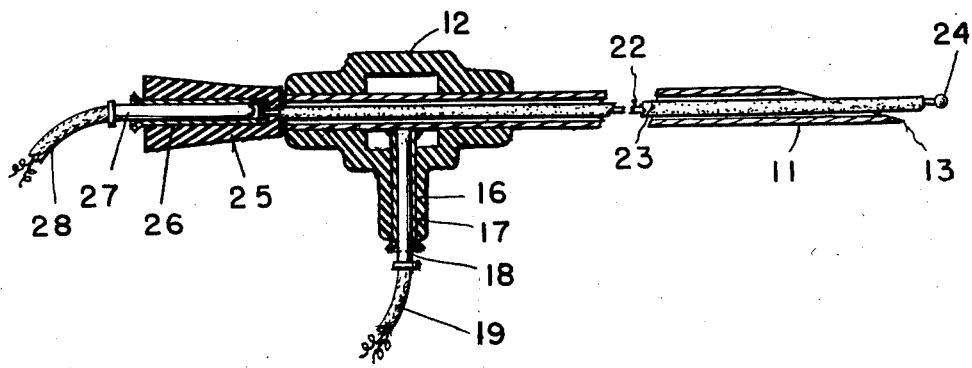
Fig. 2 is a similar section illustrating the other electrode introduced in the cannula in place of the conventional stylet.
Figure 3:
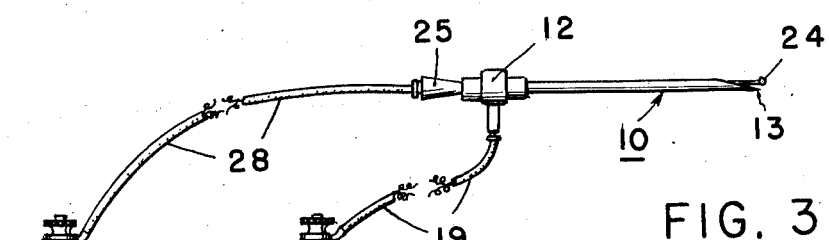
Fig. 3 is a view illustrating the electrode structure electrically connected to a micro-voltmeter.
Figure 3:
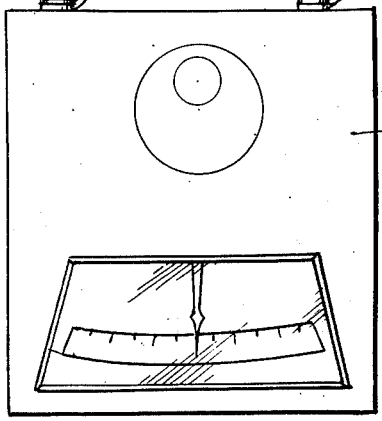

As also seen in Figs. 2 and 3, the end plug 25 of the inner electrode 22 has substantial diameter, so that its inner end face is adapted to provide a positive abutment when brought against the outer end face of the end fitting 12 of the other electrode, i. e. needle 10. Moreover, the length of the electrode 22 as measured from the inner face of its end plug 25 to its tip 24 is slightly greater than the length of the needle 11 as measured from the outer end of the fitting 12 to the needle point 13, this difference in length resulting in the tip 24 extending beyond the needle point a predetermined slight distance giving a desired electrode spacing.

In taking a measurement of blood potential in vivo, the needle 11 and its stylet 14 are placed in the vein in the usual manner, the stylet functioning to make a clean hole in the vein wall, and also closing the bore of the needle against flow of the blood therethrough upon the needle piercing the vein. The stylet 14 is thereupon withdrawn from the needle and the electrode 22 quickly introduced in place thereof, to the limit of insertion determined by the inner face of the end plug 25 abutting the outer end of the fitting 12. Such results in the tip 24 of the electrode 22 passing into the vein through the opening made by the stylet and the spacing of tip from the point 13 of the needle the desired electrode spacing. The male terminals 18, 27 are then plugged into the sockets 17 and 26 of the respective electrodes and a reading of blood potential taken on the scale of the micro-voltmeter. Since a circuit is completed through the blood coursing through the vein in which the needle point and electrode tip 24 are placed, it will be appreciated that an accurate measurement of blood potential is obtained as compared to prior techniques involving the withdrawal of blood from the body for the purpose of measuring the electrical potential thereof.

Without further analysis, it will be seen that the above described potential measuring apparatus employs electrode structure which may be placed in the vein similar to the well known intravenous needle, thus giving a novel, highly effective, yet simple technique of taking the potential of blood in vivo. The electrode apparatus is extremely simple to use, and its parts are readily accessible for cleaning and sterilizing.

As many changes could be made in carrying out the constructions without departing from the scope of the invention, it is intended that all matter contained in the above description or shown in the accompanying drawings shall be interpreted as illustrative and not in a limiting sense.

I claim:

Apparatus for measuring the electrical potential of the blood of a living animal subject comprising a tubular electrode having the form of the cannula of an intravenous needle, the pointed end of which is adapted to be placed in the vein of the subject, a thin rod-form electrode adapted to be inserted into the bore of the tubular electrode, said last electrode having its body portion coated with an insulating material and terminating in an enlarged ball-shaped tip which is uncoated, the rod-form electrode being longer than the tubular electrode by an amount providing the desired electrode spacing between its tip and the pointed end of said tubular electrode, and electrical outlets associated with the other ends of said electrodes.

ARMAND C. GREZ.

References Cited in the file of this patent

UNITED STATES PATENTS

| Number | Name | Date |
|---|---|---|
| 1,910,827 | Fedotoff | May 23, 1933 |
| 2,247,875 | Ellis | July 1, 1941 |

FOREIGN PATENTS

| Number | Country | Date |
|---|---|---|
| 438,793 | Germany | Dec. 23, 1926 |
| 475,767 | Germany | May 1, 1929 |

OTHER REFERENCES

Impulses in Motor Nerve Fibres—Journal of Physiology—vol. 67—1929—pp. 133–135. (Copy in Scientific Library.)